United States Patent
Kosaka et al.

(10) Patent No.: US 11,378,787 B2
(45) Date of Patent: Jul. 5, 2022

(54) LENS APPARATUS AND CAMERA SYSTEM

(71) Applicant: CANON KABUSHIKI KAISHA, Tokyo (JP)

(72) Inventors: Yuichi Kosaka, Utsunomiya (JP); Shinsuke Yoshida, Tokyo (JP)

(73) Assignee: CANON KABUSHIKI KAISHA, Tokyo (JP)

( * ) Notice: Subject to any disclaimer, the term of this patent is extended or adjusted under 35 U.S.C. 154(b) by 481 days.

(21) Appl. No.: 16/549,972

(22) Filed: Aug. 23, 2019

(65) Prior Publication Data
US 2020/0073094 A1    Mar. 5, 2020

(30) Foreign Application Priority Data
Aug. 31, 2018  (JP) .............................. JP2018-163189

(51) Int. Cl.
| | |
|---|---|
| G02B 15/14 | (2006.01) |
| H04N 5/225 | (2006.01) |
| G02B 15/22 | (2006.01) |
| G02B 7/02 | (2021.01) |

(52) U.S. Cl.
CPC ......... G02B 15/1421 (2019.08); G02B 15/22 (2013.01); H04N 5/2254 (2013.01); G02B 7/022 (2013.01)

(58) Field of Classification Search
CPC .... G02B 15/1421; G02B 15/22; G02B 7/022; H04N 5/2254
See application file for complete search history.

(56) References Cited

U.S. PATENT DOCUMENTS

| | | | | |
|---|---|---|---|---|
| 4,560,237 A | * | 12/1985 | Ohkura | G02B 7/04 359/825 |
| 4,721,972 A | * | 1/1988 | Wakabayashi | G03B 17/04 396/349 |
| 2004/0042775 A1 | * | 3/2004 | Nomura | G02B 7/102 396/73 |

(Continued)

FOREIGN PATENT DOCUMENTS

| | | |
|---|---|---|
| CN | 101526668 A | 9/2009 |
| CN | 102129113 A | 7/2011 |

(Continued)

*Primary Examiner* — William R Alexander
*Assistant Examiner* — Sharrief I Broome
(74) *Attorney, Agent, or Firm* — Canon U.S.A., Inc. IP Division

(57) ABSTRACT

A lens apparatus includes an optical system including a front lens group having a positive refractive power and configured to move to an object side during focusing from infinity to a close-distance object, and a rear lens group arranged on an image side of the front lens group and configured to be immovable during focusing, a motor configured to move the front lens group, and a holding member including a flange portion, on the object side, extending in a direction orthogonal to an optical axis of the optical system and configured to hold at least part of the rear lens group, wherein the motor includes a coil, a casing housing the coil, and a shaft portion extending from the casing in an optical-axis direction of the optical system, and arranged at a position at which an end surface on the image side of the casing is on the object side with respect to the flange portion in the optical-axis direction.

13 Claims, 9 Drawing Sheets

(56) References Cited

U.S. PATENT DOCUMENTS

| | | | |
|---|---|---|---|
| 2007/0248344 A1* | 10/2007 | Santo | G03B 3/04 |
| | | | 348/E5.046 |
| 2011/0026147 A1* | 2/2011 | Yonemitsu | G11B 7/08582 |
| | | | 359/822 |
| 2011/0103789 A1* | 5/2011 | Honjo | H04N 5/23209 |
| | | | 348/335 |
| 2012/0019680 A1 | 1/2012 | Shimada | |
| 2012/0044580 A1 | 2/2012 | Suzuki | |
| 2016/0004030 A1* | 1/2016 | Shiramizu | G02B 7/021 |
| | | | 359/826 |
| 2016/0299349 A1* | 10/2016 | Cho | G03B 3/10 |
| 2016/0306148 A1* | 10/2016 | Hara | G02B 9/60 |

FOREIGN PATENT DOCUMENTS

| | | |
|---|---|---|
| CN | 104105991 A | 10/2014 |
| CN | 104885019 A | 9/2015 |
| CN | 105190391 A | 12/2015 |
| CN | 107450145 A | 12/2017 |
| WO | 2013141410 A1 | 9/2013 |

* cited by examiner

US 11,378,787 B2

LENS APPARATUS AND CAMERA SYSTEM

BACKGROUND OF THE INVENTION

Field of the Invention

The present invention relates to a lens apparatus and a camera system.

Description of the Related Art

As an actuator for moving part of components in an optical system, a motor driven by energizing a coil, such as a stepping motor or a voice coil motor, is known. In a case where an amount of energization to the coil is large or the arrangement position of the motor is close to an image-capturing element in, for example, a mirrorless camera, due to the influence of a magnetic field occurring due to energization to the coil, noise is likely to be superposed on an image signal that the image-capturing element generates.

United States Patent Application Publication No. 2012/0019680 discusses a technique that reduces noise to be superposed on an image signal by changing a drive frequency of a drive device for an image-capturing element at a timing of reading out charge from the image-capturing element.

However, in United States Patent Application Publication No. 2012/0019680, when a measure of noise reduction is not taken on the camera side in an image pickup system including an interchangeable lens apparatus, influence of a magnetic field occurring from the lens apparatus cannot be reduced. In this situation, without considering the configuration of an optical system in the lens apparatus, simple arrangement of a motor at the farthest position from an image-capturing element causes a possibility that the lens apparatus becomes larger, depending on the configuration of the optical system.

SUMMARY OF THE INVENTION

According to an aspect of the present invention, a lens apparatus includes an optical system including a front lens group having a positive refractive power and configured to move to an object side during focusing from infinity to a close-distance object, and a rear lens group arranged on an image side of the front lens group and configured to be immovable during focusing, a motor configured to move the front lens group, and a holding member including a flange portion, on the object side, extending in a direction orthogonal to an optical axis of the optical system and configured to hold at least part of the rear lens group, wherein the motor includes a coil, a casing housing the coil, and a shaft portion extending from the casing in an optical-axis direction of the optical system, and arranged at a position at which an end surface on the image side of the casing is on the object side with respect to the flange portion in the optical-axis direction.

According to another aspect of the present invention, a lens apparatus includes an optical system including a front lens group having a positive refractive power and configured to move to an object side during focusing from infinity to a close-distance object, and a rear lens group arranged on an image side of the front lens group and configured to be immovable during the focusing, a motor configured to move the front lens group, a guide barrel configured to guide a movement of the front lens group, and a cam barrel configured to rotate with respect to the guide barrel by driving the motor, to move the front lens group, wherein the motor is arranged adjacent to the image side of the cam barrel, and wherein the following conditional expression is satisfied:

$$0.20 < \Delta/L < 0.30$$

where $\Delta$ represents a moving distance of the front lens group during focusing from a state where the optical system is focusing on an object at infinity to a state where the optical system has a lateral magnification of −0.5, and L represents an entire lens length of the optical system focusing on the infinity.

Further features of the present invention will become apparent from the following description of exemplary embodiments with reference to the attached drawings.

DESCRIPTION OF THE EMBODIMENTS

Figure 1A:
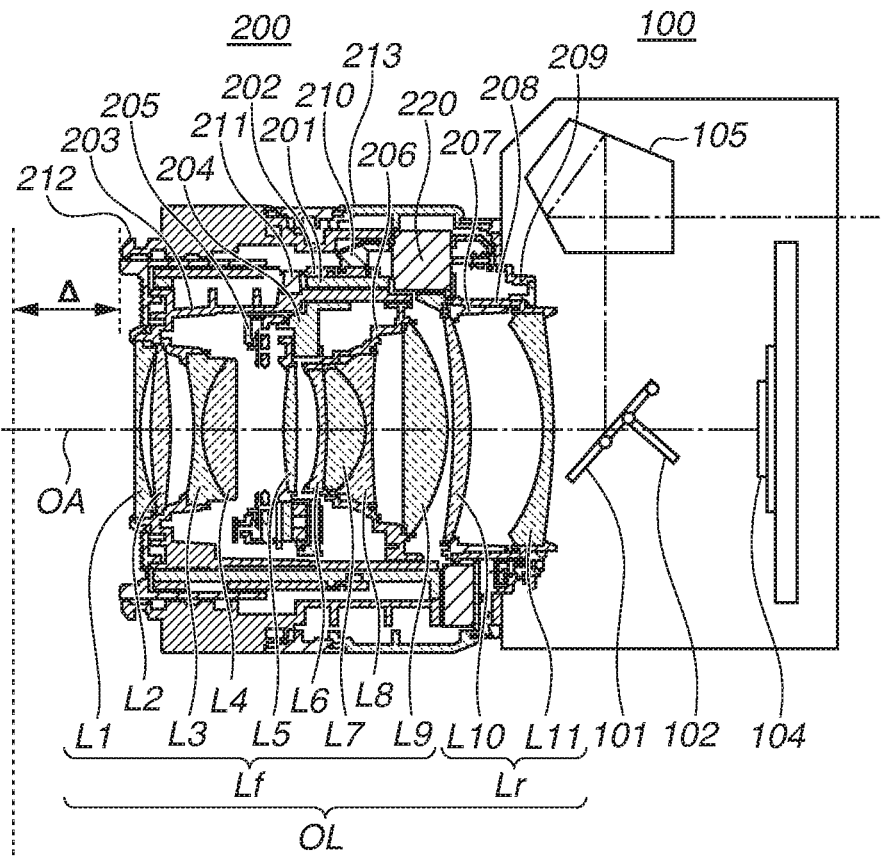
FIGS. 1A and 1B each illustrate a configuration of a lens apparatus and a camera.

A lens apparatus and a camera system according to exemplary embodiments of the present invention will be described in detail below with reference to the accompanying drawings. The same components are denoted with the same reference numerals in the drawings and thus the duplicate descriptions thereof will be omitted.

Figure 1B:
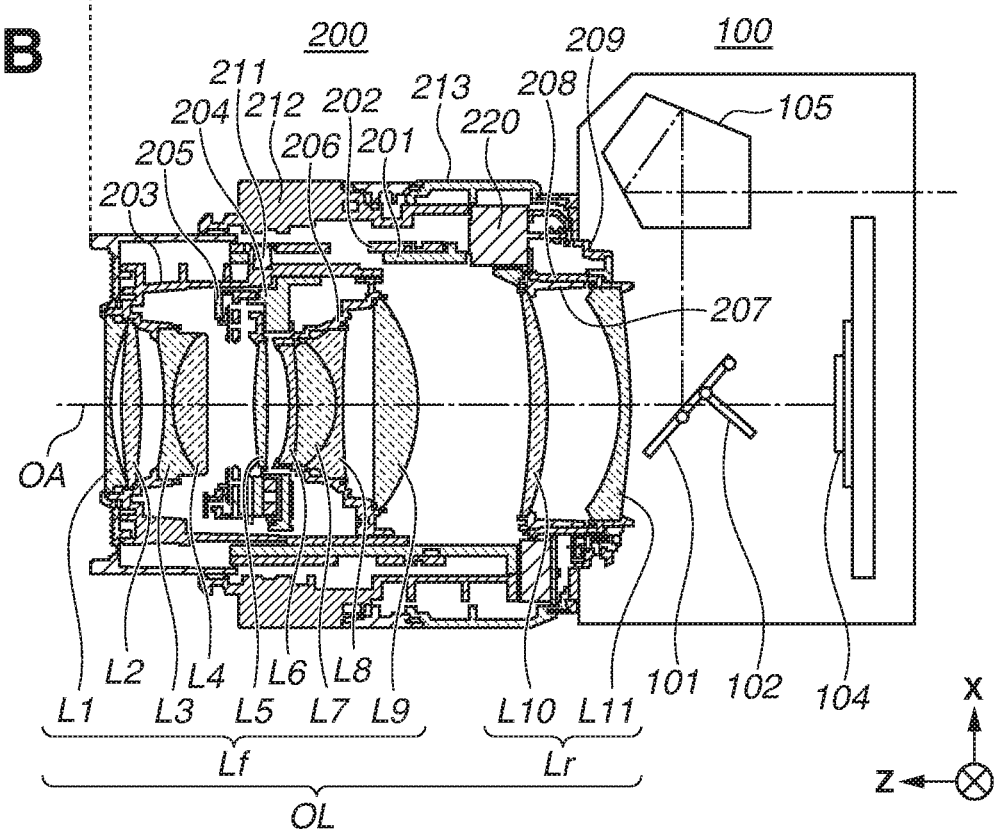

FIGS. 1A and 1B illustrates a configuration of a camera 100 and a lens apparatus 200 that is attachable to and detachable from the camera 100, according to a first exemplary embodiment. Referring to FIGS. 1A and 1B, an optical-axis direction of an optical system OL in the lens apparatus 200 is defined as a Z-axis direction, and two direction which are both parallel to the outer shape of an image-capturing element (light-receiving element) 104 and mutually orthogonal are defined as a Y-axis direction and an X-axis direction, respectively.

In the camera 100, a mirror 101 reflects part of a light flux from the optical system OL, to a pentaprism 105, and transmits the residual light flux through the mirror 101. The pentaprism 105 guides the incident light to the observation side by internal reflection. A mirror 102 guides the light transmitted through the mirror 101 to an autofocus (AF) optical system (not illustrated) for distance measuring. When the mirrors 101 and 102 are moved outside an optical path, the image-capturing element 104 receives an image formed by the optical system OL of the lens apparatus 200 and generates an image signal of the received image.

Next, the configuration of the lens apparatus 200 will be described. The optical system OL includes a front lens group Lf having a positive refractive power that moves to the object side during focusing from infinity to a close-distance object and a rear lens group Lr arranged on the image side (camera side) of the front lens group Lf, immovable during the focusing. FIG. 1A illustrates the optical system OL focusing on an object at infinity, and FIG. 1B illustrates the optical system OL having a lateral magnification of −0.5. Referring in FIG. 1A, the moving distance of the front lens group Lf is indicated by sign Δ. The front lens group Lf includes nine lenses of lenses L1 to L9, and the rear lens group Lr includes two lenses of lenses L10 and L11. An aperture diaphragm 205 is arranged between the lens L4 and the lens L5 that moves in a direction orthogonal to an optical axis OA at a time of correcting image shaking.

The lens barrel of the lens apparatus 200 includes a fixed barrel 212, an outer barrel 213, and a mount 209. The mount 209, which is the coupling portion between the lens apparatus 200 and the camera 100, is connected with the fixed barrel 212 via the outer barrel 213. The mount 209 holds a guide barrel 201, a 1A lens barrel 203, and a 2B lens barrel 208 indirectly via the fixed barrel 212.

The holding mechanism for the front lens group Lf will be described. The 1A lens barrel 203 holds the lenses L1 to L4. A 1B lens barrel 204 holds the lens L5 and the aperture diaphragm 205. A 1C lens barrel 206 holds the lenses L6 to L9. The 1B lens barrel 204 and the 1C lens barrel 206 are fixed to the 1A lens barrel 203.

A motor 220 moves the 1A lens barrel 203 in the Z-axis direction via the guide barrel 201, a cam barrel 202 having a gear cam 210, and a cam follower 211. As described above, because the 1B lens barrel 204 and the 1C lens barrel 206 are fixed to the 1A lens barrel 203, when the 1A lens barrel 203 moves in the Z-axis direction, the 1B lens barrel 204 and the 1C lens barrel 206 move integrally with the 1A lens barrel 203. In other words, the motor 220 has a function of indirectly moving the front lens group Lf in the Z-axis direction.

The cam barrel 202 is arranged outside the guide barrel 201. The cam follower 211 fixed to the 1A lens barrel 203 engages with a translatory guide groove (not illustrated) of the guide barrel 201 formed in the Z-axis direction and a cam groove (not illustrated) included in the cam barrel 202. Rotation of the cam barrel 202 by the drive of the motor 220 causes the cam follower 211 to move along the translatory guide groove of the guide barrel 201, so that the front lens group Lf moves along with the movement of the cam follower 211.

Figure 2:
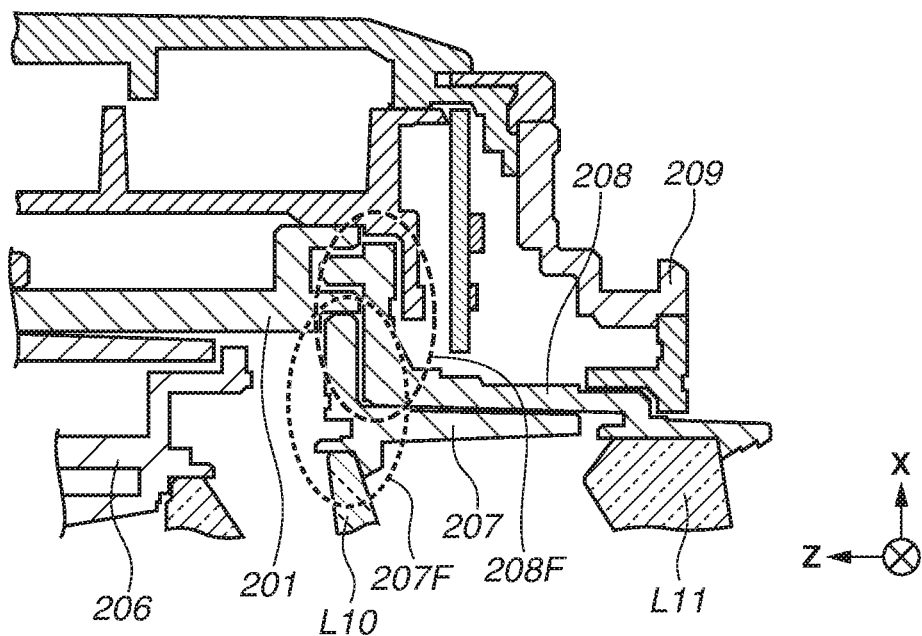
FIG. 2 illustrates a peripheral configuration of lens barrels.

The holding mechanism for the rear lens group Lr will be described. A 2A lens barrel 207 holds the lens L10, and the 2B lens barrel (holding member) 208 holds the lens L11 that is a part of the rear lens group Lr. FIG. 2 illustrates a peripheral configuration of the 2A lens barrel 207 and the 2B lens barrel 208, and is a cross-sectional view of a cross section different from that of FIGS. 1A and 1B. The 2A lens barrel 207 includes, on the object side, a flange portion 207F extending in the direction orthogonal to the optical axis of the optical system OL (direction orthogonal to the Z axis, for example, the radial direction of the optical system OL). The 2B lens barrel 208 includes, on the object side, a flange portion 208F extending in the direction orthogonal to the optical axis. The 2A lens barrel 207 is fixed to the 2B lens barrel 208 in such a manner that the flange portion 207F abuts on the object side of the flange portion 208F. The 2B lens barrel 208 is fixed to the guide barrel 201 via the flange portion 208F. However, the flange portions 207F and 208F are not necessarily formed at the respective ends on the object side of the 2A lens barrel 207 and the 2B lens barrel 208 as in the present exemplary embodiment. The flange portions 207F and 208F only require forming at least on the object side with respect to the respective intermediate positions in the Z-axis direction of the 2A lens barrel 207 and the 2B lens barrel 208.

Figure 3:
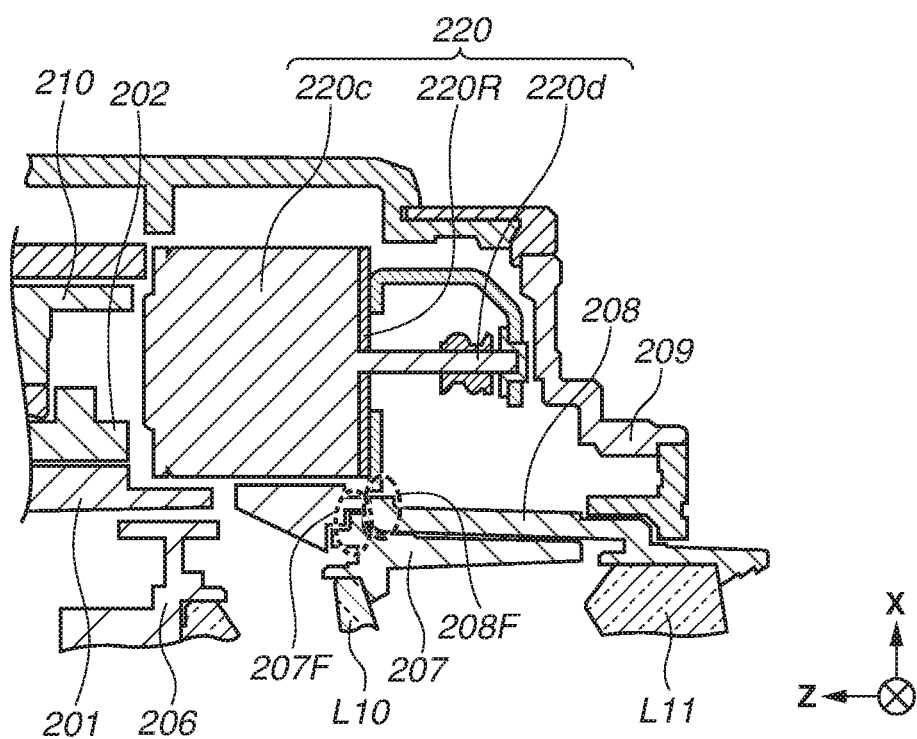
FIG. 3 illustrates a peripheral configuration of the lens barrels.

The flange portions 207F and 208F are formed differently in height depending on the circumferential position. For example, FIG. 3 is a cross-sectional view different from that of FIG. 2. The flange portions 207F and 208F in the cross-sectional view of FIG. 3 are formed shorter in length in the direction orthogonal to the optical axis than the flange portions 207F and 208F in the cross-sectional view of FIG. 2.

<Configuration and Arrangement of Motor>

Next, arrangement of the motor 220 suitable for the optical system OL described above, in the present exemplary embodiment, will be described.

Figure 4:
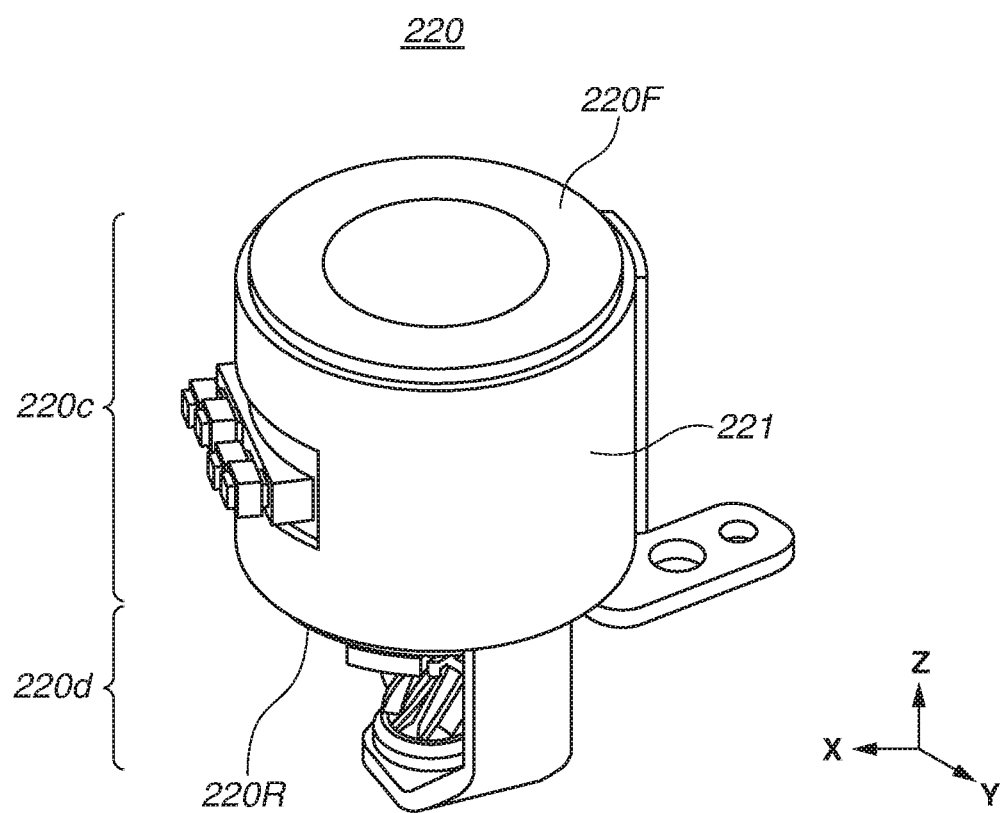
FIG. 4 illustrates a configuration of an actuator.
Figure 9:
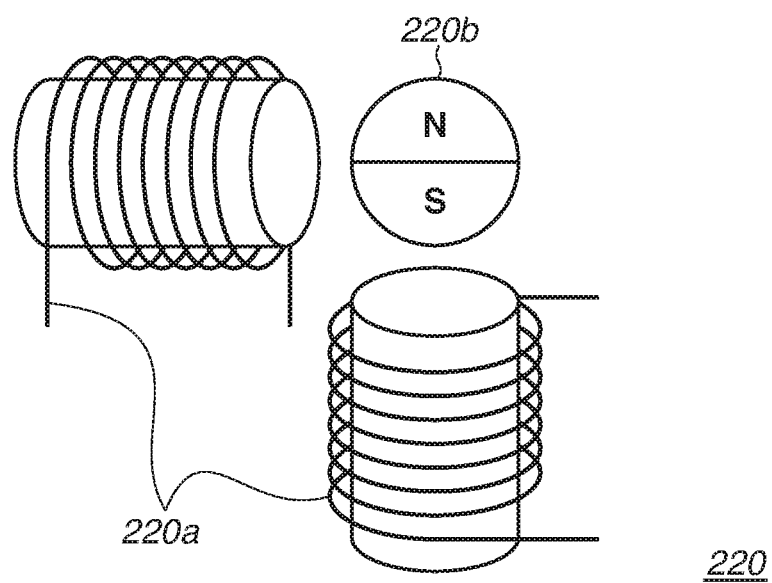
FIG. 9 illustrates a configuration of a motor.

The configuration and arrangement of the motor 220 will be described with reference to FIGS. 3, 4, and 9. According to the present exemplary embodiment, a kind of the motor 220 is a stepping motor. The motor 220 includes a magnet 220b, coils 220a, a casing 220c, and a shaft portion 220d. In the motor 220, the four coils 220a (two coils are not illustrated) are arranged along the circumferential direction of the magnet 220b and when the coils 220a are energized, the magnet 220b rotates relative to the coils 220a. The coils 220a and the magnet 220b are housed in the casing 220c. The casing 220c may have a cylindrical shape as illustrated in FIG. 4 or may have a different shape. The shaft portion 220d, which is a portion extending from the casing 220c in the Z-axis direction, is rotationally driven along with rotation of the magnet 220b. Transmission of the generated force in rotation to the gear cam 210 via a pinion (not illustrated) and a gear train (not illustrated) causes the gear cam 210 to rotate. Then, the rotation of the gear cam 210 causes the cam barrel 202 to rotate. Then, the rotation of the cam barrel 202 to the guide barrel 201 causes the front lens group Lf to move in the Z-axis direction. In a case where the magnet 220b is rod-shaped, a part of the magnet 220b may protrude outward from the casing 220c.

The optical system OL generally used in a lens apparatus for close-up imaging has features that the lens diameter is large, and the lens group closest on the object side has a relatively large moving distance during focusing. Thus, preferably but optionally, the motor 220 is arranged at a position that does not cause the lens apparatus 200 to be larger. Thus, according to the present exemplary embodiment, the motor 220 is arranged at a position at which an end surface 220R on the image side of the casing 220c is on the object side with respect to the flange portion 208F. The arrangement at that position enables reduction of the lens apparatus 200 in size and reduction of noise to an image signal that the image-capturing element 104 acquires, in comparison with a case where the motor 220 is arranged at a different position.

For example, arrangement of the end surface 220R of the motor 220 at a position on the image side with respect to the flange portion 208F causes the influence of noise due to a magnetic field to increase at the image-capturing element 104. Arrangement of the end surface 220R of the motor 220 outside the flange portion 208F in the direction orthogonal to the optical axis causes the lens apparatus 200 to increase the diameter thereof.

Furthermore, in the present exemplary embodiment, the motor 220 is arranged at the position at which the motor 220 overlaps the guide barrel 201 and the cam barrel 202 in the Z-axis direction. In this way, preferably but optionally, the motor 220 overlaps at least one of the guide barrel 201 and the cam barrel 202 in the Z-axis direction (in optical-axis direction view). In other words, preferably but optionally, the motor 220 is not arranged outside the guide barrel 201. This arrangement enables the diameter of the lens apparatus 200 to be smaller than the diameter in a case where the motor 220 is arranged outside the guide barrel 201 in the direction orthogonal to the optical axis of the optical system OL.

Furthermore, in the present exemplary embodiment, the position at which the motor 220 is arranged is on the image side with respect to the cam barrel 202 and the guide barrel 201. This arrangement enables avoiding an increase in diameter of the lens apparatus 200. If the motor 220 is arranged on the object side with respect to the guide barrel 201 and the cam barrel 202, there is a possibility that the motor 220 interferes with the front lens group Lf during focusing.

Furthermore, in the present exemplary embodiment, the motor 220 is arranged so that the central axis of each coil 220a extends along the X-axis direction or the Y-axis direction. Preferably but optionally, the motor 220 is arranged so that the central axis of each coil 220a is not parallel to the Z-axis direction. This arrangement could prevent the principal direction of a magnetic field generated when the coils 220a are energized from being lead to the image-capturing element 104. Thus, noise signal, which is generated due to the magnetic field, on an image signal that the image-capturing element 104 acquires can be reduced.

Furthermore, in the motor 220, as illustrated in FIG. 4, the surface of the casing 220c may be provided with a shield (magnetic shielding member) 221 that reduces the magnetic flux that passes through the surface. Preferably but optionally, at least part of the surface on the object side and the surface on the image side of the casing 220c is covered with the shield 221. This arrangement enables attenuation of the strength or change of the direction of a magnetic field generated by the motor 220 when the coils 220a are energized. Thus, noise signal on an image signal that the image-capturing element 104 acquires can be reduced.

<Relationship Between Optical System and Motor>

Next, the configuration of the optical system OL and the arrangement relationship between the optical system OL and the motor 220 in the lens apparatus 200 according to the present exemplary embodiment will be described.

As described above, because the optical system OL includes the lenses having a relatively large moving distance during focusing, arrangement of the motor 220 at an inappropriate position on the image side with respect to the cam barrel 202 causes noise to be more likely to be superposed on an image signal of a captured image. Meanwhile, spacing the motor 220 extremely apart from the image-capturing element 104 in the Z-axis direction causes the lens apparatus 200 to increase the diameter or the entire length.

In a case where the optical system OL has an absolute value of 0.5 or more in lateral magnification, preferably but optionally, the optical system OL satisfies the following conditional expression (1):

$$0.20 < \Delta/L < 0.30 \quad (1)$$

where Δ represents the moving distance of the front lens group Lf during focusing from a state where the optical system OL focusing on an object at infinity to a state where the optical system OL has a lateral magnification of −0.5, and L represents the entire lens length of the optical system OL when focusing on an object at infinity.

The motor 220 is arranged adjacent to the image side of the cam barrel 202. Here, the meaning of "arranged adjacent" is not limited to a case where the motor 220 abuts on the cam barrel 202, and but also a case where the motor 220 is arranged with an air interval without any member.

The moving distance Δ relates to the lengths in the Z-axis direction of the guide barrel 201 and the cam barrel 202. On condition that the motor 220 is arranged adjacent to the image side of the cam barrel 202, appropriate determination of the moving distance Δ and the entire lens length L results in appropriate determination of the arrangement position of the motor 220 (distance from an image plane). The arrangement of the motor 220 adjacent to the image side of the cam barrel 202 enables reduction of the diameter of the lens apparatus 200. Securing the moving distance Δ at a predetermined level for satisfying the conditional expression (1) enables reduction of noise signal on an image signal that the image-capturing element 104 acquires, with high optical performance.

In a case where exceeding the upper limit of the conditional expression (1) causes an increase in the moving distance of the front lens group Lf, the cam barrel 202 and the guide barrel 201 become longer in the Z-axis direction. Thus, the distance between the motor 220 and the image-capturing element 104 in focus on infinity decreases, so that noise is more likely to be superposed on an image signal that the image-capturing element 104 generates. Furthermore, the lens apparatus 200 increases in weight, and the lens apparatus 200 increases in entire length at movement of the front lens group Lf to the object side. Below the lower limit of the conditional expression (1), the front lens group Lf and the rear lens group Lr rise in refractive power, resulting in an increase in aberration. Thus, this arrangement is not preferable.

Furthermore, preferably but optionally, the optical system OL satisfies at least one of the following conditional expressions (2) to (5). Satisfaction of at least one conditional expression enables acquisition of at least any effect of further downsizing of the lens apparatus 200, enhancement in optical performance of the optical system OL, and noise reduction to a captured image.

$$0.10 < LR/L < 0.50 \quad (2)$$

$$0.05 < f/|f2| < 0.40 \quad (3)$$

$$0.80 < f1/f < 1.20 \quad (4)$$

$$0.50 < Lfh/LF < 1.00 \quad (5)$$

where LF represents the distance on the optical axis from the surface closest on the object side to the surface closest on the image side of the front lens group Lf (hereinafter, referred to as the thickness of the front lens group Lf), and LR represents the distance on the optical axis from the surface closest on the object side and the surface closest on the image side of the rear lens group Lr (hereinafter, referred to as the thickness of the rear lens group Lr). L represents the entire lens length of the optical system OL focusing on an object at infinity. f represents the focal length of the optical system OL focusing on an object at infinity, f1 represents the focal length of the front lens group Lf, and f2 represents the focal length of the rear lens group Lr. Lfh represents the distance from the surface closest on the object side of the front lens group Lf to the principal plane of the front lens group Lf.

The conditional expression (2) relates to a preferred range for the ratio between the thickness of the rear lens group Lr and the entire lens length. In a case where exceeding the upper limit of the conditional expression (2) causes an increase in the thickness of the rear lens group Lr, the rear lens group Lr rises in refractive power, and the front lens group Lf rises in refractive power along with the rise. Thus, aberration increases, and aberration variation increases during focusing. In a case where shortage of the lower limit of the conditional expression (2) causes a decrease in the thickness of the rear lens group Lr, the cam barrel 202 is arranged closer to the image-capturing element 104, and furthermore the motor 220 is arranged at a position close to the image-capturing element 104. Thus, noise is more likely to be superposed on an image signal that the image-capturing element 104 generates.

The conditional expression (3) relates to a preferred range for the absolute value of the ratio in focal length between the rear lens group Lr and the optical system OL. In a case where exceeding the upper limit of the conditional expression (3) causes a decrease in the absolute value of the focal length of the rear lens group Lr and a rise in the refractive power of the rear lens group Lr, various aberrations, such as spherical aberration, increase. In a case where falling below the lower limit of the conditional expression (3) causes an increase in the absolute value of the focal length of the rear lens group Lr and a drop in the refractive power of the rear lens group Lr, the entire lens length becomes longer.

The conditional expression (4) relates to a preferred range for the ratio in focal length between the front lens group Lf and the optical system OL. In a case where exceeding the upper limit of the conditional expression (4) causes an increase in the focal length of the front lens group Lf and a drop in the refractive power of the front lens group Lf, the entire lens length of the optical system OL becomes longer. In a case where falling below the lower limit of the conditional expression (4) causes a decrease in the focal length of the front lens group Lf and a rise in the refractive power of the front lens group Lf, various aberrations, such as spherical aberration, increase.

The conditional expression (5) relates to a preferred range for the position of the principal plane of the front lens group Lf. Satisfying the range of the conditional expression (5) enables a decrease in the effective diameter of a lens arranged relatively on the object side of the optical system OL, resulting in downsizing of the optical system OL. Above the upper limit of the conditional expression (5), the principal plane of the front lens group Lf is behind the front lens group Lf. Thus, the lenses included in the front lens group Lf rise in refractive power, resulting in an increase in aberration. Below the lower limit of the conditional expression (5), the lens L1 increases in effective diameter. Thus, the optical system OL increases in diameter.

Preferably but optionally, the numerical ranges of the conditional expressions (2) to (5) satisfy the following conditional expressions (2a) to (5a), respectively.

$$0.13 < LR/L < 0.40 \quad (2a)$$

$$0.10 < |f/f2| < 0.35 \quad (3a)$$

$$0.90 < f1/f < 1.10 \quad (4a)$$

$$0.60 < Lfh/LF < 0.90 \quad (5a)$$

More preferably, the numerical ranges of the conditional expressions (2) to (5) satisfy the following conditional expressions (2b) to (5b), respectively.

$$0.15 < LR/L < 0.35 \quad (2b)$$

$$0.15 < |f/f2| < 0.30 \quad (3b)$$

$$0.95 < f1/f < 1.05 \quad (4b)$$

$$0.70 < Lfh/LF < 0.85 \quad (5b)$$

Figure 5:
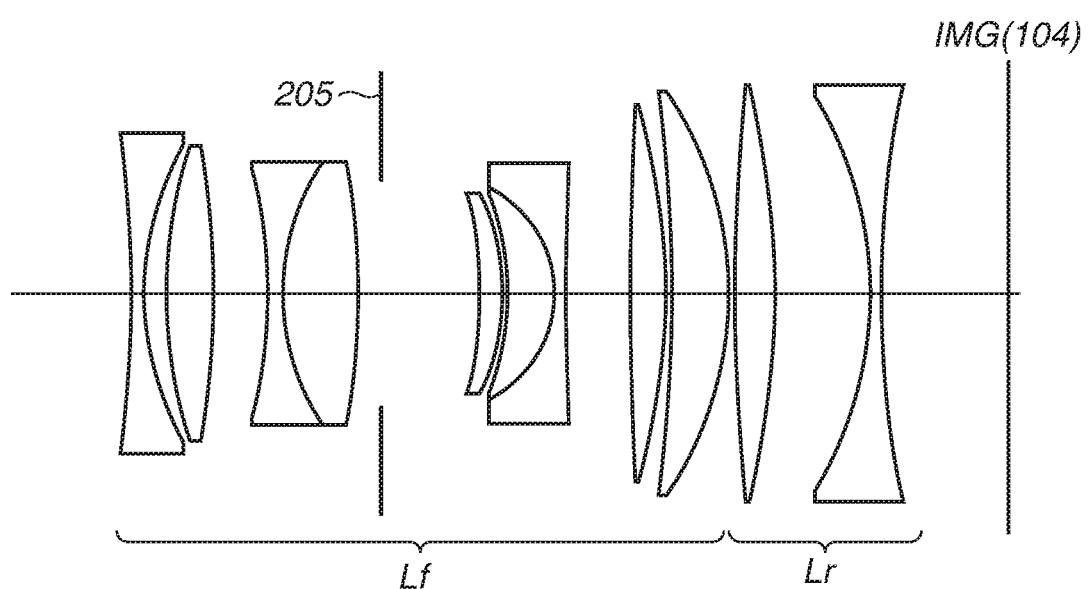
FIG. 5 is a cross-sectional view of an optical system according to a first exemplary embodiment.
Figure 6A:
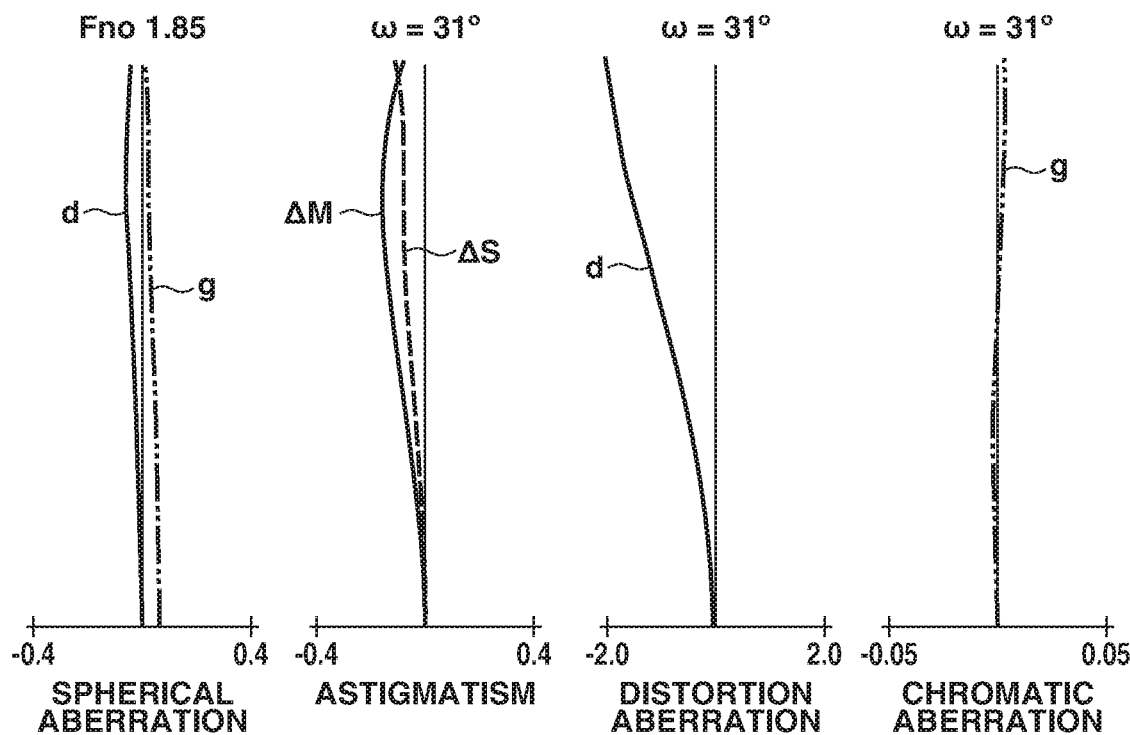
FIGS. 6A and 6B are aberration diagrams of the optical system according to the first exemplary embodiment.
Figure 6B:
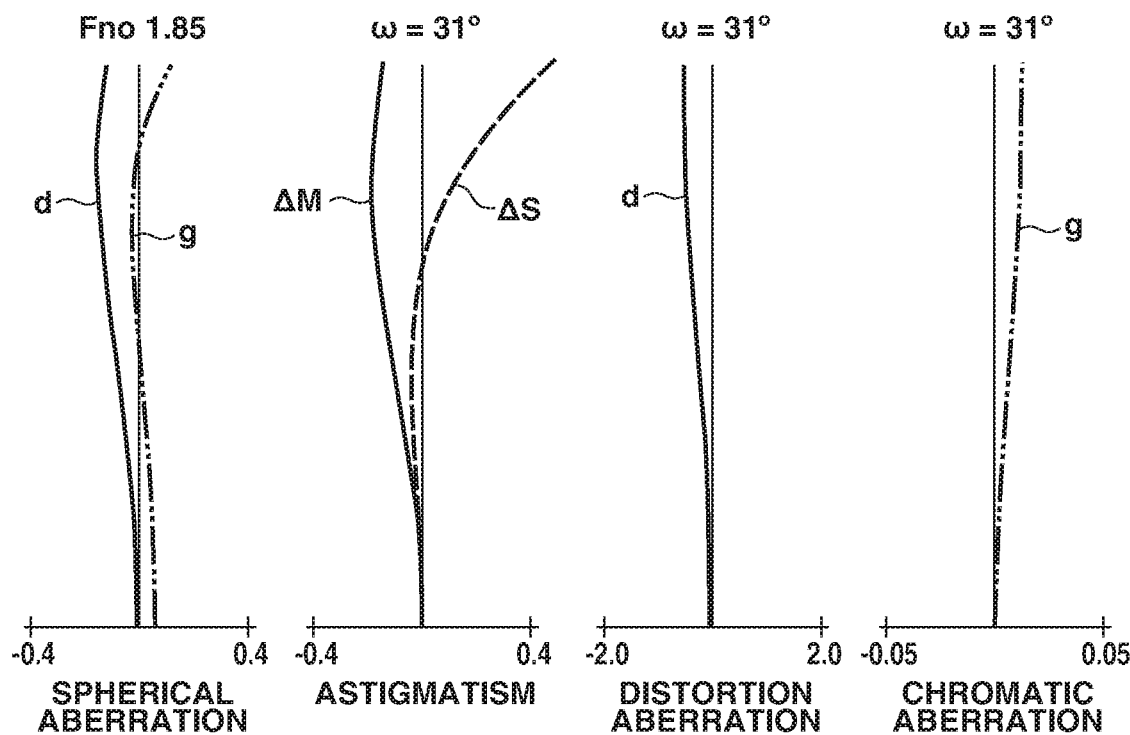
Figure 7:
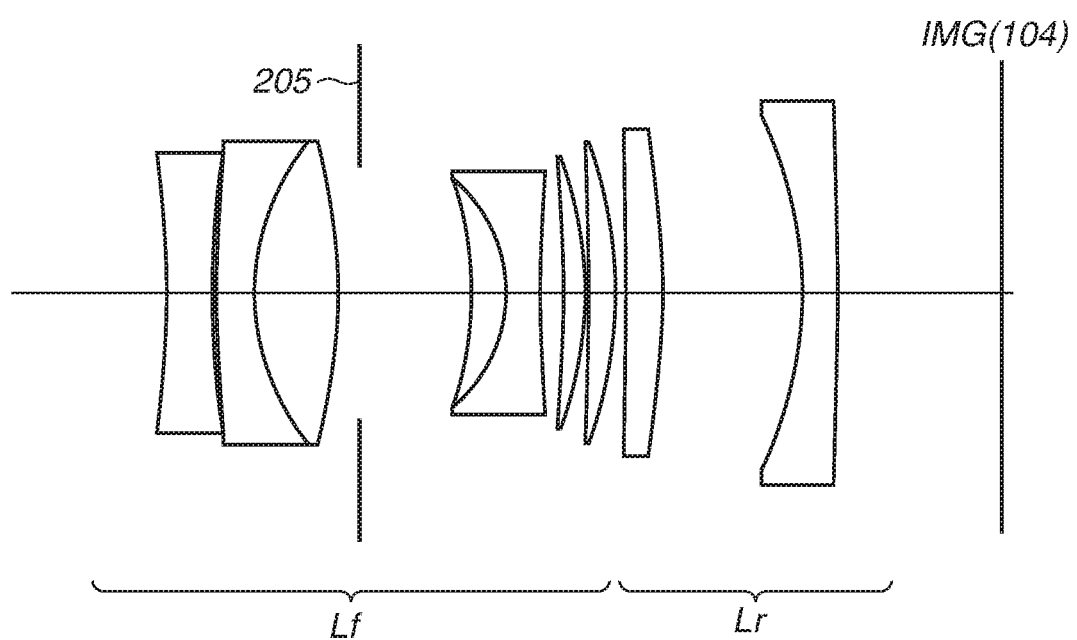
FIG. 7 is a cross-sectional view of an optical system according to a second exemplary embodiment.
Figure 8A:
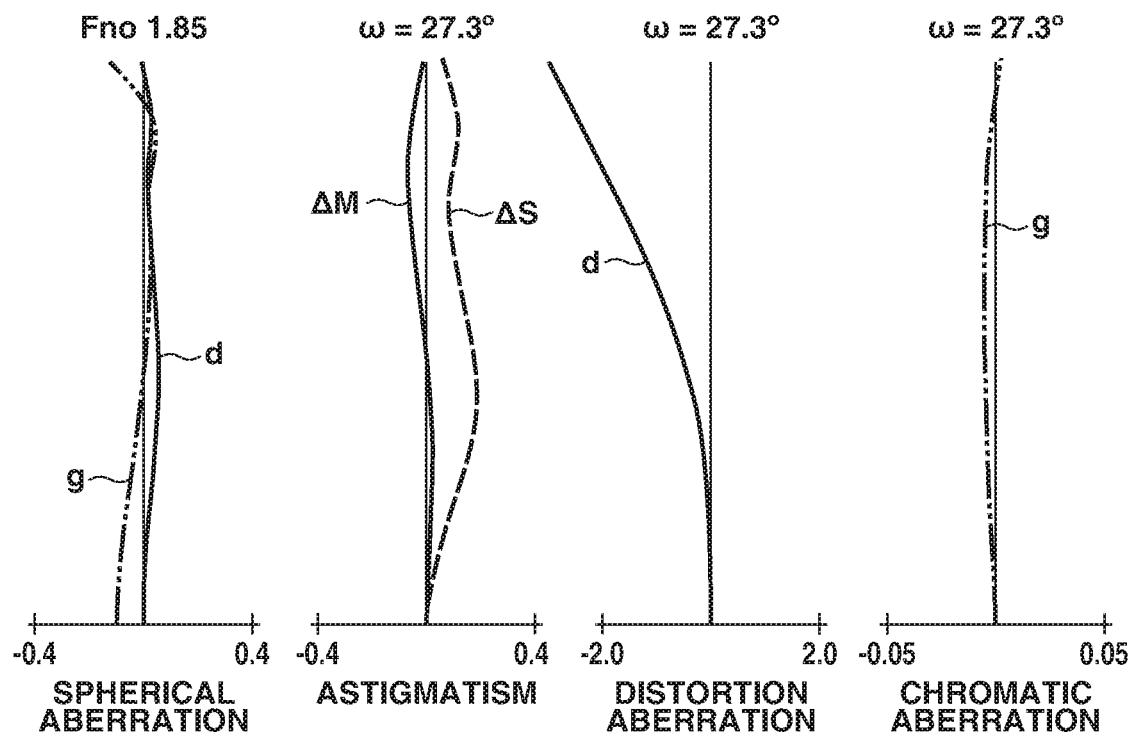
FIGS. 8A and 8B are aberration diagrams of the optical system according to the second exemplary embodiment.
Figure 8B:
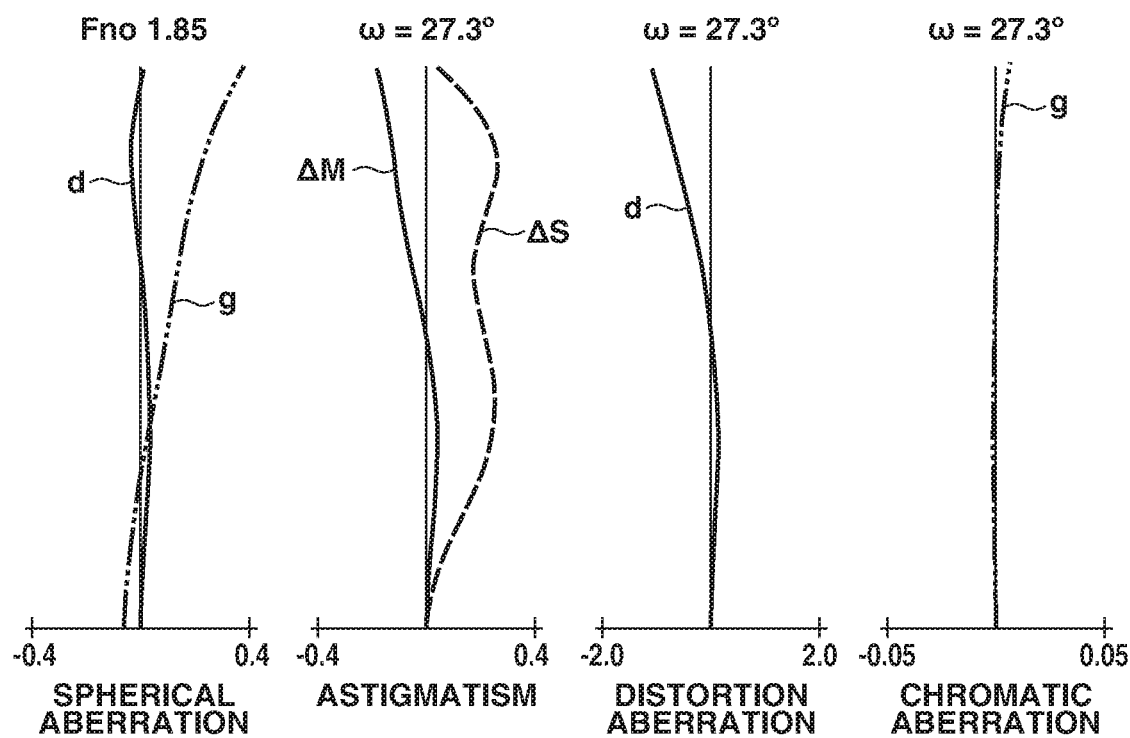

Examples of the optical system OL will be described with reference to FIGS. 5 to 8B. FIG. 5 is a cross-sectional view of an optical system OL according to the first exemplary embodiment. FIGS. 6A and 6B are aberration diagrams of the optical system OL according to the first exemplary embodiment. FIG. 7 is a cross-sectional view of an optical system OL according to a second exemplary embodiment. FIGS. 8A and 8B are aberration diagrams of the optical system OL according to the second exemplary embodiment. Referring to FIGS. 5 and 7, each image plane IMG corresponds to the arrangement position of the image-capturing element 104 in the camera 100. Each of the aberration diagrams illustrated in FIGS. 6A, 6B, 8A, and 8B indicates a spherical aberration diagram, an astigmatism diagram, a distortion aberration diagram, and a chromatic aberration diagram in order from left to right. In each spherical aberration diagram, a solid line represents the d line (wavelength of 587.6 nm) in the Fraunhofer lines and a chain double-dashed line represents the g line (wavelength of 435.84 nm) in the Fraunhofer lines. In each astigmatism diagram, a broken line ΔS represents sagittal rays and a solid line ΔM represents meridional rays. In each distortion aberration diagram, a solid line represents the d line. In each chromatic aberration diagram, a chain double-dashed line represents the g line. Each of the aberration diagrams of FIGS. 6A and 8A results from the optical system OL focusing on an object at infinity. Each of the aberration diagrams of FIGS. 6B and 8B results from the optical system OL having a lateral magnification of −0.5.

The optical systems OL according to the first exemplary embodiment and the second exemplary embodiment each include a front lens group Lf having a positive refractive power that moves to the object side during focusing from infinity to a close-distance object and a rear lens group Lr arranged on the image side of the front lens group Lf. The rear lens group Lr is immovable during the focusing.

According to the above, an optical system having at least such a configuration is suitable as an optical system OL of a lens apparatus 200 according to an exemplary embodiment of the present invention. Therefore, the number of lenses included in each of a front lens group Lf and a rear lens group Lr, the arrangement of an aperture diaphragm 205, and the shape of each lens included in the optical system OL are not limited to those of the optical system OL illustrated in FIGS. 1A and 1B and those of the respective optical systems OL according to the first exemplary embodiment and the second exemplary embodiment. The value of F-number is not limited to those according to the first exemplary embodiment and the second exemplary embodiment. The refractive power of the rear lens group Lr is not limited to being negative as in the first exemplary embodiment and the second exemplary embodiment, and may be positive.

The optical system OL according to the first exemplary embodiment and the optical system OL according to the second exemplary embodiment are different in terms of, for example, the number of lenses in the front lens group Lf, the position of the aperture diaphragm 205, and the refractive index and the shape of each lens included in the optical system OL. Specifically, the optical system OL according to the first exemplary embodiment is an optical system indicated in [First Numerical Example] to be described below, and the optical system OL according to the second exemplary embodiment is an optical system indicated in [Second Numerical Example] to be described below.

In [First Numerical Example] and [Second Numerical Example], surface number represents the order of optical surfaces from the object side. r represents the radius of curvature of an optical surface (mm), d represents the interval between adjacent optical surfaces (mm), nd represents the refractive index of the material of an optical member at the d line, and vd represents the Abbe number of the material of an optical member based on the d line. The Abbe number vd is expressed by the following expression:

$$vd=(Nd-1)/(NF-NC)$$

where NF, Nd, and NC represent the refractive indices of the material at the F line (486.1 nm), the d line (587.6 nm), and the C line (656.3 nm) in the Fraunhofer lines, respectively. BF represents back focus. The "back focus" is expressed by the air-converted length of the distance on the optical axis from the rearmost surface of the optical system OL (lens surface closest on the image side) to a paraxial image plane. The "entire lens length" is the length of the back focus added to the distance on the optical axis from the foremost surface (lens surface closest on the object side) to the rearmost surface of the optical system OL.

In each numerical example, the surface number of an aspherical surface is denoted with an asterisk * on the right side of the surface number. For an aspherical shape, when an optical-axis direction is defined as an X axis, a direction perpendicular to the optical axis is defined as an H axis, the traveling direction of light is defined as positive, R is defined as the paraxial radius of curvature, K is defined as a conic constant, and A4, A6, A8, A10, and A12 are defined as aspherical constants, the following expression is acquired:

$$X = \frac{H^2/R}{1+\sqrt{1-(1+K)(H/R)^2}} + A4 \cdot H^4 + A6 \cdot H^6 + A8 \cdot H^8 + A10 \cdot H^{10} + A12 \cdot H^{12}$$

For each aspherical constants, "e±x" means $10^{\pm x}$.

Furthermore, [Table 1] indicates respective values corresponding to the conditional expressions (1) to (5), in First Numerical Example and Second Numerical Example.

First Numerical Example

Units mm
Surface Data

| Surface number | r | d | nd | vd | Effective diameter |
|---|---|---|---|---|---|
| 1 | −101.398 | 1.20 | 1.80810 | 22.8 | 28.00 |
| 2 | 27.457 | 1.96 | | | 25.61 |
| 3 | 43.072 | 4.35 | 2.00100 | 29.1 | 25.62 |
| 4 | −76.107 | 4.94 | | | 25.21 |
| 5 | −43.452 | 1.34 | 1.51742 | 52.4 | 21.52 |
| 6 | 20.892 | 6.97 | 1.83400 | 37.2 | 22.63 |
| 7 | −57.860 | 2.00 | | | 22.44 |
| 8 (diaphragm) | ∞ | 9.00 | | | 20.92 |
| 9* | −46.158 | 2.00 | 1.58313 | 59.4 | 16.99 |
| 10 | −22.244 | 0.49 | | | 17.10 |
| 11 | −25.258 | 4.23 | 1.83400 | 37.2 | 17.55 |
| 12 | −10.915 | 1.00 | 1.80518 | 25.4 | 18.21 |
| 13 | 219.604 | 5.99 | | | 22.59 |
| 14 | 394.851 | 3.23 | 1.58913 | 61.1 | 32.92 |
| 15 | −59.412 | 0.50 | | | 33.35 |
| 16 | −138.542 | 5.23 | 1.80100 | 35.0 | 35.15 |
| 17 | −32.649 | (variable) | | | 35.80 |
| 18 | 191.652 | 3.64 | 1.69680 | 55.5 | 37.00 |
| 19 | −77.278 | 8.75 | | | 37.02 |
| 20 | −34.676 | 1.00 | 1.58144 | 40.8 | 35.08 |
| 21 | 99.122 | 11.65 | | | 36.86 |
| Image plane | ∞ | | | | |

Aspherical Surface Data
Ninth Surface
K=0.00000e+000 A4=−3.86457e−005 A6=−8.07285e−008 A8=−1.41532e−010
  A10=−1.98576e−012
Various Types of Data

| Focal length | 36.00 |
|---|---|
| f-number | 1.85 |
| Half angle of view (degrees) | 31.00 |
| Image height | 21.64 |
| Entire lens length | 79.97 |
| BF | 11.65 |

Infinity −0.5 in magnification
d17 0.50 19.14353

| Entrance-pupil position | 14.04 |
|---|---|
| Exit-pupil position | −41.18 |
| Front principal-point position | 25.51 |
| Rear principal-point position | −24.35 |

Lens-Group Data

| Group | Starting surface | Focal length | Lens structure length | Front principal-point position | Rear principal-point position |
|---|---|---|---|---|---|
| 1 | 1 | 37.13 | 54.43 | 36.51 | −10.06 |
| 2 | 18 | −135.27 | 13.39 | 30.80 | 15.75 |

Single-Lens Data

| Lens | Starting surface | Focal length |
|---|---|---|
| 1 | 1 | −26.63 |
| 2 | 3 | 27.99 |
| 3 | 5 | −27.07 |
| 4 | 6 | 19.18 |
| 5 | 9 | 71.43 |
| 6 | 11 | 20.32 |
| 7 | 12 | −12.89 |
| 8 | 14 | 87.89 |
| 9 | 16 | 52.18 |
| 10 | 18 | 79.48 |
| 11 | 20 | −44.06 |

Second Numerical Example

Units mm
Surface Data

| Surface number | r | d | nd | vd | Effective diameter |
|---|---|---|---|---|---|
| 1 | −96.518 | 4.00 | 1.85896 | 22.7 | 22.66 |
| 2* | 115.425 | 0.26 | | | 23.26 |
| 3 | 104.134 | 3.35 | 1.48749 | 70.2 | 23.31 |

-continued

| Surface number | r | d | nd | vd | Effective diameter |
|---|---|---|---|---|---|
| 4 | 20.842 | 7.10 | 1.80610 | 40.9 | 25.30 |
| 5 | −51.757 | 1.91 | | | 25.24 |
| 6 (diaphragm) | ∞ | 9.47 | | | 23.41 |
| 7 | −31.785 | 2.96 | 1.53775 | 74.7 | 19.19 |
| 8 | −13.580 | 2.96 | 1.69895 | 30.1 | 19.14 |
| 9 | 139.915 | 2.00 | | | 19.87 |
| 10 | −135.726 | 1.79 | 1.88300 | 40.8 | 22.07 |
| 11 | −37.333 | 0.36 | | | 22.51 |
| 12 | −399.907 | 2.33 | 1.88300 | 40.8 | 24.65 |
| 13 | −39.544 | (variable) | | | 24.94 |
| 14 | −659.641 | 3.12 | 2.00330 | 28.3 | 26.45 |
| 15 | −89.073 | 12.05 | | | 27.03 |
| 16* | −35.181 | 3.00 | 1.71736 | 29.5 | 29.16 |
| 17 | −579.717 | 13.97 | | | 31.91 |
| Image plane | ∞ | | | | |

Aspherical Surface Data
Second Surface
K=0.00000e+000 A4=1.11348e−005 A6=−6.54297e−009 A8=1.45473e−010 A10=−3.78548e−013 A12=6.79599e−016
Sixteenth Surface
K=0.00000e+000 A4=−4.25646e−006 A6=7.76315e−008 A8=−4.15916e−010 A10=1.07574e−012 A12=−1.00091e−015
Various Types of Data

| | Wide angle |
|---|---|
| Focal length | 41.92 |
| f-number | 1.85 |
| Half angle of view (degrees) | 27.30 |
| Image height | 21.64 |
| Entire lens length | 71.50 |
| BF | 13.97 |

Infinity −0.5 in magnification
d13 0.87 21.87

| Entrance-pupil position | 9.94 |
|---|---|
| Exit-pupil position | −30.05 |
| Front principal-point position | 11.94 |
| Rear principal-point position | −27.95 |

Lens-Group Data

| Group | Starting surface | Focal length | Lens structure length | Front principal-point position | Rear principal-point position |
|---|---|---|---|---|---|
| 1 | 1 | 41.96 | 38.48 | 24.57 | −8.19 |
| 2 | 14 | −139.74 | 18.17 | 33.03 | 14.10 |

Single-Lens Data

| Lens | Starting surface | Focal length |
|---|---|---|
| 1 | 1 | −60.67 |
| 2 | 3 | −54.17 |
| 3 | 4 | 19.27 |
| 4 | 7 | 41.72 |
| 5 | 8 | −17.57 |
| 6 | 10 | 57.83 |
| 7 | 12 | 49.55 |
| 8 | 14 | 102.36 |
| 9 | 16 | −52.33 |

TABLE 1

| | First Numerical Example | Second Numerical Example |
|---|---|---|
| (1) | 0.24 | 0.29 |
| (2) | 0.17 | 0.25 |
| (3) | −0.27 | −0.30 |
| (4) | 1.03 | 1.00 |
| (5) | 0.82 | 0.78 |

<Camera System>

A camera system according to an exemplary embodiment of the present invention includes an interchangeable lens apparatus 200 and a camera 100 which the lens apparatus 200 is attachable to and detachable from or includes a camera including a lens apparatus 200 and a camera 100 integrally formed. A camera 100 may be a single-lens reflex camera including mirrors 101 and 102 or may be a mirrorless camera with no mirrors 101 and 102. In a case where a lens apparatus 200 and a camera 100 are integrally formed, the configuration of the camera 100 is substantially similar to the configuration of the camera 100 illustrated in FIGS. 1A and 1B, except for the lens apparatus 200 fixed to the camera 100 with no mirrors 101 and 102 and no mount 209.

Additional Exemplary Embodiments

The flange portions 207F and 208F may be formed uniformly in height regardless of circumferential position. Alternatively, as long as a portion not less than half of each of the flange portions 207F and 208F, in circumferential position, extends in the direction orthogonal to the optical axis, the rest does not necessarily extend in the direction orthogonal to the optical axis.

According to the above-described exemplary embodiment, the motor 220 that is a stepping motor has been described. However, as long as the motor 220 serves as an actuator driven by energizing a coil, the motor 220 may be a different type of motor. For example, the motor 220 may be a direct-current (DC) motor. The motor 220 may be a lead screw motor, and may move the 1A lens barrel 203. The arrangement of the coils in the motor 220 is not limited to that according to the exemplary embodiments, and thus can be appropriately changed corresponding to the motor 220 or the optical system OL.

The 2B lens barrel 208 is only required to hold at least part of the rear lens group Lr. For example, the 2B lens barrel 208 may also function as the 2A lens barrel 207, and may hold the lenses L10 and L11.

The optical system OL according to each of the numerical examples having an absolute value of 0.5 as the maximum value in lateral magnification has been exemplified, but an optical system OL according to an exemplary embodiments of the present invention is not limited in characteristic to this. The maximum value of the absolute value in lateral magnification may be below 0.5, but is preferably 0.5 or more for favorable close-up imaging.

The embodiments of the present invention have been described above, but the present invention is not limited to the embodiments. Thus, various modifications and alterations may be made without departing from the scope of the spirit thereof.

While the present invention has been described with reference to exemplary embodiments, it is to be understood that the invention is not limited to the disclosed exemplary embodiments. The scope of the following claims is to be accorded the broadest interpretation so as to encompass all such modifications and equivalent structures and functions.

This application claims the benefit of Japanese Patent Application No. 2018-163189, filed Aug. 31, 2018, which is hereby incorporated by reference herein in its entirety.

What is claimed is:

1. A lens apparatus comprising:
an optical system including a front lens group having a positive refractive power and configured to move to an object side during focusing from infinity to a close-distance object, and a rear lens group arranged on an image side of the front lens group and configured to be immovable during focusing;
a motor configured to move the front lens group; and
a holding member including a flange portion on the object side extending in a direction orthogonal to an optical axis of the optical system and configured to hold at least part of the rear lens group,
wherein the motor includes a coil, a casing housing the coil, and a shaft portion extending from the casing in an optical-axis direction of the optical system, and arranged at a position at which an end surface on the image side of the casing is on the object side with respect to the flange portion in the optical-axis direction.

2. The lens apparatus according to claim 1, further comprising:
a guide barrel configured to guide movement of the front lens group; and
a cam barrel configured to rotate with respect to the guide barrel due to drive of the motor, to move the front lens group,
wherein the motor is arranged at a position at which the motor overlaps at least one of the guide barrel and the cam barrel in the optical-axis direction.

3. The lens apparatus according to claim 1, wherein the following conditional expression is satisfied, $$0.20<\Delta/L<0.30$$

where $\Delta$ represents a moving distance of the front lens group during focusing from a state where the optical system is focusing on an object at infinity to a state where the optical system has a lateral magnification of −0.5, and L represents an entire lens length of the optical system focusing an object at the infinity.

4. A lens apparatus comprising:
an optical system including a front lens group having a positive refractive power and configured to move to an object side during focusing from infinity to a close-distance object, and a rear lens group arranged on an image side of the front lens group and configured to be immovable during the focusing;
a motor configured to move the front lens group;
a guide barrel configured to guide a movement of the front lens group; and
a cam barrel configured to rotate with respect to the guide barrel by driving the motor, to move the front lens group,
wherein the motor is arranged adjacent to the image side of the cam barrel, and wherein the following conditional expression is satisfied:

$$0.20<\Delta/L<0.30$$

where $\Delta$ represents a moving distance of the front lens group during focusing from a state where the optical system is focusing on an object at infinity to a state where the optical system has a lateral magnification of −0.5, and L represents an entire lens length of the optical system focusing on the infinity.

5. The lens apparatus according to claim 4, wherein the motor is arranged at a position at which the motor overlaps at least one of the guide barrel and the cam barrel in an optical-axis direction of the optical system.

6. The lens apparatus according to claim 1, wherein the following conditional expression is satisfied:

$$0.10<LR/L<0.50$$

where LR represents a distance on an optical axis from a surface closest on the object side to a surface closest on the image side of the rear lens group, and L represents an entire lens length of the optical system focusing on the infinity.

7. The lens apparatus according to claim 1, wherein the following conditional expression is satisfied:

$$0.05<f/|f2|<0.40$$

where f represents a focal length of the optical system focusing on the infinity, and f2 represents a focal length of the rear lens group.

8. The lens apparatus according to claim 1, wherein the following conditional expression is satisfied:

$$0.80<f1/f<1.20$$

where f1 represents a focal length of the front lens group, and f represents a focal length of the optical system focusing on the infinity.

9. The lens apparatus according to claim 1, wherein the following conditional expression is satisfied:

$$0.50<Lfh/LF<1.00$$

where Lfh represents a distance from a surface closest on the object side of the front lens group to a principal plane of the front lens group, and LF represents a distance on an optical axis from the surface closest on the object side to a surface closest on the image side of the front lens group.

10. The lens apparatus according to claim 1, wherein at least part of a surface on the object side of the casing and a surface on the image side of the casing is covered with a magnetic shielding member.

11. The lens apparatus according to claim 1, wherein the motor is arranged in such a manner that a central axis of the coil is not parallel to the optical-axis direction.

12. A camera system comprising:
a lens apparatus including
an optical system including a front lens group having a positive refractive power and configured to move to an object side during focusing from infinity to a close-distance object, and a rear lens group arranged on an image side of the front lens group and configured to be immovable during the focusing,
a motor configured to move the front lens group, and
a holding member including, on the object side, a flange portion extending in a direction orthogonal to an optical axis of the optical system and configured to hold at least part of the rear lens group; and
a light-receiving element configured to receive an image formed by the optical system, wherein the motor includes a coil, a casing housing the coil, and a shaft portion extending from the casing in an optical-axis direction of the optical system, and arranged at a position at which an end surface on the image side of the casing is on the object side with respect to the flange portion in the optical-axis direction.

13. A camera system comprising:
a lens apparatus including
   a front lens group having a positive refractive power and configured to move to an object side during focusing from infinity to a close-distance object, and a rear lens group arranged on an image side of the front lens group and configured to be immovable during the focusing;
   a motor configured to move the front lens group,
   a guide barrel configured to guide the movement of the front lens group, and
   a cam barrel configured to rotate to the guide barrel due to drive of the motor, to move the front lens group; and
a light-receiving element configured to receive an image formed by the optical system,
wherein the motor is arranged adjacently to the image side of the cam barrel, and
wherein the following conditional expression is satisfied:

$$0.20 < \Delta/L < 0.30$$

where $\Delta$ represents a moving distance of the front lens group during focusing from a state where the optical system is focusing on an object at infinity to a state where the optical system has a lateral magnification of −0.5, and L represents an entire lens length of the optical system focusing on the infinity.

* * * * *